Patented Apr. 26, 1932

1,855,387

UNITED STATES PATENT OFFICE

ALBERT W. DROBILE, OF CYNWYD, PENNSYLVANIA, ASSIGNOR TO COLLINS & AIKMAN CORPORATION, OF PHILADELPHIA, PENNSYLVANIA, A CORPORATION OF DELAWARE

ART OF COATING

No Drawing.     Application filed September 20, 1929.     Serial No. 394,142.

My improvements in the art of coating are designed to provide a freely spreading compound of low cost, good elasticity and stable character which is capable of close control for viscosity and setting. Compounds made in accordance with my improvements are particularly applicable to the coating of fabrics, such, for instance, as pile fabrics having the pile warps thereof so loosely enmeshed in the backing fabric as to be normally unsuitable for ordinary use due to the subnormal number of threads in the backing fabric. By the utilization of my improved coating such loosely woven fabric backings may be impregnated therewith without penetration thereof through to the face of the fabric and without detracting from the appearance of the fabric; the pile warps are securely anchored, the fabric is re-enforced, and raveling or shedding of the fabric is prevented.

In accordance with my improvements, latex or a latex compound is fortified or re-enforced by the dispersion therein of a coagulated rubber which during or prior to the process of dispersion therein is provided with a protective coating and a colloid. To effect such dispersion of coagulated rubber the latex, either in its natural condition or in the form of a compound, is preferably diluted to a thin aqueous solution having, say, a ten per cent rubber content. The coagulated rubber may be either in the crude form or it may be reclaimed rubber and is masticated with a colloid adapted to form a coating on the rubber globules analogous to the protective coatings surrounding the rubber globules in latex. Casin, saponin, rosin soap, or soapy vegetable extracts are appropriate for use as protective colloids, and are preferably thoroughly dispersed in the rubber by mastication therewith in a rubber mill until the rubber is reduced to a soft, plastic condition.

The dilute latex or latex compound may be then added gradually to the plastic coagulated rubber with sufficient agitation to thoroughly disperse the plastic in the liquid vehicle.

The necessary vulcanizers, accelerators and tempering ingredients may be added to the latex solution, or to the coagulated rubber in the mill, or to the constituents in the mixer or to the mixture.

While it is not ordinarily preferable, the masticated plastic may, if desired, be first reduced to a fluid by the addition thereto of organic solvents and emulsifying agents. By suitable agitation, the masticated plastic rubber may be thoroughly dispersed in and emulsified with an organic solvent, and the resulting fluid emulsified with latex or latex compounds. When the masticated rubber solution and latex solution have been thoroughly commingled and emulsified, the organic solvent may be segregated by evaporation or otherwise. The residual compound of intimately mixed latex and dispersed coagulated rubber may be subjected to any usual treatment or utilized directly as a coating. The organic solvent may be recovered for re-use in any usual manner.

The viscosity and setting of compounds so formed are subject to accurate control for the purpose desired, since the latex tends to coagulate or solidify rapidly and accelerates the solidification or coagulation of the aqueous rubber dispersion, while the coagulated rubber tends to check the rapidity or coagulation or solidification of latex or latex compounds.

I have found that artificial aqueous dispersions of rubber penetrate fabrics, and particularly textiles, much farther and quicker than latex compounds, apparently because the protective colloid coating the rubber particles prevents rapid coagulation thereof, but the addition of latex to artificial aqueous dispersions promotes coagulation and limits penetration, gives improved ageing, smooths spreading properties, and eliminates tackiness and sensitiveness to temperature changes.

While the characteristics of my improved product are rendered particularly applicable for the coating of fabrics, it also has advantages when used for other purposes for which either rubber or latex have been heretofore used.

Having described my invention, I claim:—

A woven fabric having a subnormal number of threads in its backing and pile warps so loosely enmeshed in the backing fabric as to be normally unsuitable for ordinary use and a coating impregnating said fabric without penetration through to the face thereof and comprising solidified latex fortified by the dispersion therein of a previously coagulated rubber provided with a colloid forming a protective coating for the rubber globules and facilitating penetration thereof into the fabric.

In testimony whereof I have hereunto set my hand this 16th day of September, 1929.

ALBERT W. DROBILE.